Sept. 27, 1966     K. KUPFERBERG     3,275,925

ELECTROLYTIC CELL ANODE POTENTIAL CONTROL SYSTEM

Filed Sept. 7, 1962

INVENTOR.
KENNETH KUPFERBERG
BY Alfred W. Barber
ATTORNEY

United States Patent Office 3,275,925
Patented Sept. 27, 1966

3,275,925
ELECTROLYTIC CELL ANODE POTENTIAL
CONTROL SYSTEM
Kenneth Kupferberg, Flushing, N.Y., assignor to Forbro
Design Corp., New York, N.Y., a corporation of New
York
Filed Sept. 7. 1962, Ser. No. 222,142
1 Claim. (Cl. 323—4)

The present invention concerns voltage and/or current regulation in electrical systems and in particular systems for controlling the voltage supplied to a circuit in accordance with the resulting voltage drop across a portion of the circuit.

Reference is made to Patent No. 3,028,538 entitled, "Regulated Output Voltage Power Supply," showing a voltage regulated power supply utilizing a four terminal bridge circuit. The basic circuit shown in this patent is used in the present invention and reference is made to the patent for details of the circuit and its operation. Briefly stated, a bridge circuit is formed starting at the terminal at the left and progressing clockwise. The four arms of the bridge from this starting point are made up of a voltage reference between the first and second terminals, a fixed reference resistor between the second and third terminals, a variable voltage control resistor between the third and fourth terminals and a parallel circuit including a source of unregulated voltage in series with a series pass device (transistor) shunted by a load impedance between the fourth and first terminals. An error (control) amplifier is connected between the first and third terminals and serves to control the series pass device. When the bridge is balanced the voltage across the fixed reference resistor equals the reference voltage and the voltage across the variable control resistor equals the voltage across the load impedance. If conditions tend to depart from the above, the error amplifier varies the controls of the pass device in such a way as to tend to restore the stated conditions.

The present invention utilizing the above described circuit as a starting point, provides a control and output voltage as follows. One of the terminals of the error amplifier is disconnected from the bridge and connected to an external device. This external device includes at least a portion of the load impedance across which the voltage is regulated. The voltage of an element in the external device, which depends on the current through the devcie, is compared with a reference voltage and the resultant is applied to the error amplifier. The error amplifier acts on the series pass device to reduce this resultant to zero. Thus the potential of a sensing element in the load impedance is maintained at a predetermined voltage in accordance with the current through the load resulting from a controlled voltage across the load.

Accordingly, one object of the present invention is to provide a method of and means for controlling the voltage across a device in accordance with the current through the device.

Another object is to provide a low ripple voltage across a device in accordance with a sample voltage taken from a point within the device and representing the current through the device.

These and other objects of the present invention will be apparent from the detailed description of the figures of the drawing.

Figure 1:
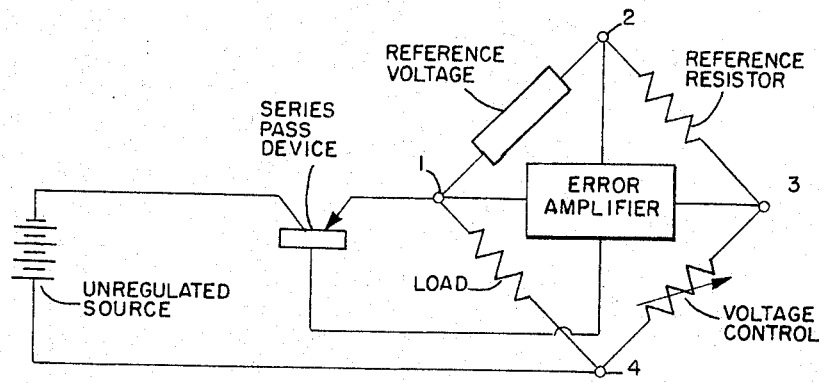
FIGURE 1 is a simplified schematic diagram of the prior art bridge circuit utilized in the present invention.

FIG. 1 shows the prior art bridge controlled voltage regulator with the bridge circuit connected around terminals 1, 2, 3 and 4. The various parts of the circuit are marked with functional designations. A source of reference voltage is connected between terminals 1 and 2; a fixed reference resistor between terminals 2 and 3; a variable voltage control resistor between terminals 3 and 4; and a load resistor shunted by a source of unregulated voltage in series with a controlled series pass transistor between terminal 4 and 1. When this bridge is balanced, no voltage appears across the input to the error amplifier at terminals 1 and 3. The error amplifier controls the pass device (transistor) in such a way as to return this voltage between terminals 1 and 3 if any condition arises which tends to make it depart from zero such as a change in load resistance: The bridge is balanced when:

$$\frac{\text{Reference Voltage}}{\text{Reference Resistor}} = \frac{\text{Load Voltage}}{\text{Voltage Control Resistor}}$$

Thus the load voltage may be varied by varying the value of the voltage control resistor.

Figure 2:
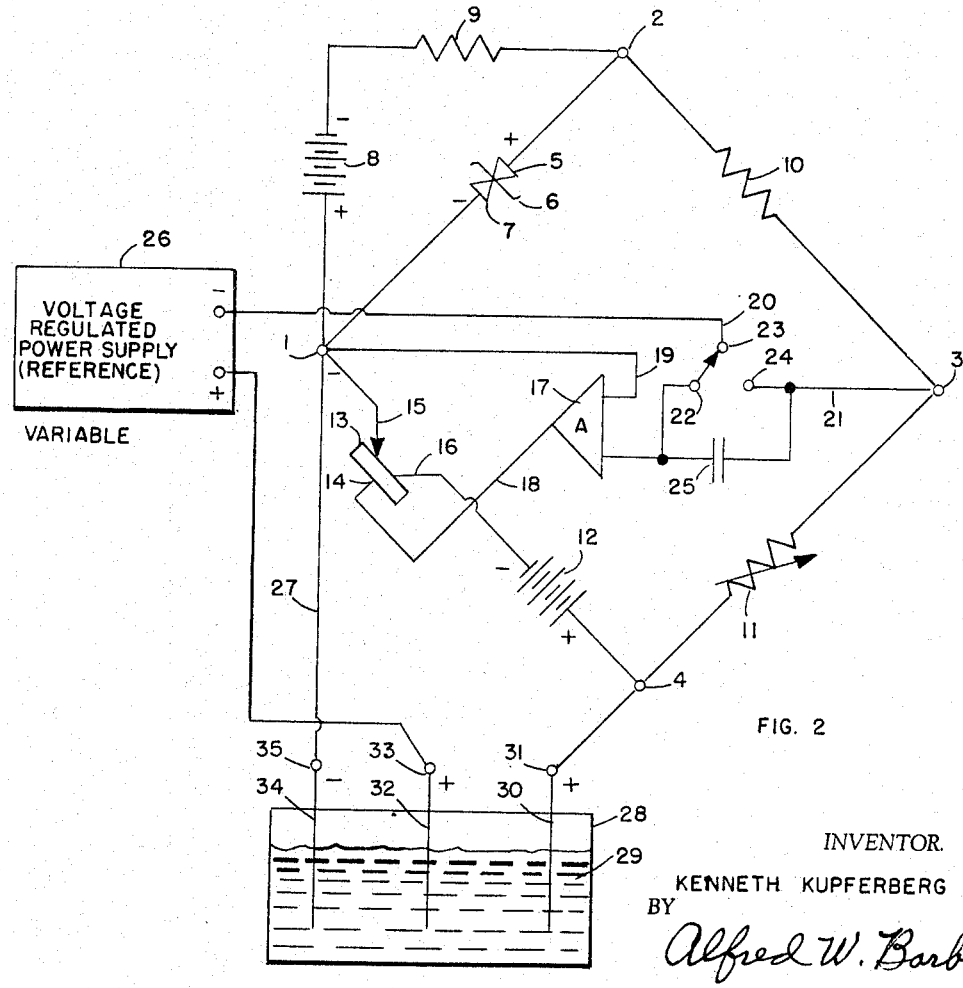
FIGURE 2 is a simplified combined schematic and block diagram of the preferred form of the present invention.

FIG. 2 shows a similar bridge circuit having terminals 1, 2, 3, and 4. Between terminals 1 and 2 is connected a temperature compensating double anode Zener diode including anodes 5 and 7 and cathode 6 across which is established a reference voltage as by the parallel circuit including a suitable source of voltage such as battery 8 applied through a dropping resistor 9. Between terminals 2 and 3 is connected a fixed reference resistor 10. Between terminals 3 and 4 is connected a variable voltage control resistor 11. Between terminals 4 and 1 is connected a suitable source of unregulated voltage such as battery 12 and a controllable series pass device such as transistor 13 which includes base 14, emitter 15 and collector 16. The device to be supplied with a controlled voltage is represented by the electrolyte 29 contained in tank 28. This tank contains the main electrodes 30 and 34 connected to terminals 31 and 35 respectively which in turn are connected across bridge terminals 4 and 1 and the voltage sensing electrode 32 connected to terminal 33. The input to error amplifier 17 is connected from bridge terminal 1 over lead 19 and to the arm 22 of switch 22–23–24. When this switch is operated to close contacts 22 to 24, the error amplifier acts to maintain a regulated voltage across load terminals 1 and 4 in accordance with the setting of voltage control resistor 11 as in the prior art circuit referred to above. This regulation of the error amplifier causes the series pass transistor 13 to adjust its impedance which is in series with voltage source 12 so that the required voltage appears across the load terminals 1 and 4 and the voltage across terminals 1 and 3 (the input to the error amplifier) is substantially zero. That is the error amplifier in conjunction with the series pass transistor acts to maintain zero voltage at the input to the error amplifier. Now, when the switch is operated to close contacts 22 to 23, a series circuit including reference voltage supply 26 over lead 20 and the path between electrodes 34 and 32 over lead 27 and terminals 35 and 33 is connected across the input to the error amplifier. The error amplifier and the pass transistor will now act to maintain the input to the error amplifier at zero which means that the voltage drop between electrodes 32 and 34 will be maintained equal and opposite to the voltage supplied from reference supply 26. This is done automatically when the pass transistor 13 regulates the voltage between electrodes 30 and 34 so that the required current flows through the electrolyte 29 to provide the required potential at electrode 32. Thus, the potential at electrode 32 and hence the current through the electrolyte 29 is under control of the voltage from reference supply 26. The voltage from reference supply 26 is to be adjustable over the range of voltages over which the potential of electrode 32 is to be controlled.

When switch arm 22 is closed to contact 24, the circuit as described above, places a regulated voltage across the terminals 31 and 35 of the electrolytic cell. This voltage may be controlled by means of variable control resistor 11 so that an initial or setup condition may be established in the cell. Thus either a regulated voltage controlled by resistor 11 or a voltage depending on the potential of electrode 32 can be chosen by means of switch 22–23–24.

While voltage source 12 is shown as a battery, it may be, and usually is an unregulated power supply including an alternating current transformer, rectifier and filter. When error amplifier 17 is connected across terminals 1 and 3, its regulating function not only provides constant output voltage but also acts to reduce ripple in the output voltage. Now when error amplifier 17 is switched to the external sensing circuit, this ripple reduction function would be lost but can be restored by connecting a substantial capacitor 25 from the disconnected terminal 3 to the input of the error amplifier. This capacitor 25 applies the residual ripple across the regulated circuit between terminals 1 and 4 of the bridge to the error amplifier which in turn causes the series pass transistor 13 to vary in impedance in such a direction as to reduce the ripple.

Voltage source 8 is shown as a battery. This source may be a battery, unregulated voltage source or, best of all, a current regulated source of power. However, any suitable source of reference voltage may be supplied between terminals 1 and 2.

While only one form of the present invention has been shown and described, many modifications will be apparent to those skilled in the art and within the spirit and scope of the invention as set forth, in particular, in the appended claim.

What is claimed is:

In a system for controlling electrical conditions in an electrolyte, the combination of, an electrolyte through which the current is to be controlled, two main electrodes at least partially immersed in said electrolyte, a bridge circuit controlled voltage programmable regulated power supply including an error amplifier connected to supply programmed power to said electrodes, a sensing electrode at least partially immersed in said electrolyte, a series circuit including a source of reference voltage comprising the output of a variable output voltage regulated power supply, one of said main electrodes and said sensing electrode connected to said error amplifier for programming said regulated power supply to drive current between said main electrodes in accordance with the potential of said sensing electrode and the voltage from said variable output voltage regulated power supply whereby the power output of said programmable power supply is programmed to said main electrodes under control of said variable output power supply and the substantially zero current potential of said electrode.

References Cited by the Examiner

UNITED STATES PATENTS

| | | | |
|---|---|---|---|
| 2,584,816 | 2/1952 | Sands | 204—195 |
| 2,795,759 | 6/1957 | Rezek | 204—195 |
| 2,976,474 | 3/1961 | Dodge | 323—9 |
| 3,028,538 | 4/1962 | Rosenfeld | 323—22 |
| 3,067,123 | 12/1962 | Huber | 204—231 |
| 3,201,680 | 8/1965 | Ross et al. | 323—9 |
| 3,207,977 | 9/1965 | Ellison et al. | 324—30 |

JOHN F. COUCH, *Primary Examiner.*

LLOYD McCOLLUM, *Examiner.*

L. HADLAND, H. B. KATZ, K. D. MOORE, *Assistant Examiners.*